US009436938B1

(12) United States Patent
Botros et al.

(10) Patent No.: US 9,436,938 B1
(45) Date of Patent: Sep. 6, 2016

(54) TRANSACTION PAYMENT PROCESSING BY MULTIPLE DATA CENTERS

(71) Applicant: Square, Inc., San Francisco, CA (US)

(72) Inventors: Paul Abraham Botros, San Francisco, CA (US); Theodore Wenjung Mao, Mountain View, CA (US); Kathryn Spradlin, San Francisco, CA (US); John Pongsajapan, San Francisco, CA (US); Jonathan Andrew Wolter, San Francisco, CA (US); Jiang-Ming Yang, Fremont, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/711,120

(22) Filed: May 13, 2015

(51) Int. Cl.
*G06Q 20/00* (2012.01)
*G06F 9/455* (2006.01)
*G06Q 20/20* (2012.01)
*G07G 1/14* (2006.01)
*G06Q 20/40* (2012.01)

(52) U.S. Cl.
CPC ............ *G06Q 20/202* (2013.01); *G06Q 20/40* (2013.01); *G07G 1/14* (2013.01)

(58) Field of Classification Search
USPC .............................................. 705/21; 703/27
See application file for complete search history.

(56) References Cited

U.S. PATENT DOCUMENTS

| | | | |
|---|---|---|---|
| 5,983,208 A * | 11/1999 | Haller et al. ..................... 705/40 |
| 6,192,408 B1 * | 2/2001 | Vahalia et al. ................. 709/229 |
| 6,445,717 B1 * | 9/2002 | Gibson et al. ................. 370/473 |
| 2005/0138461 A1 * | 6/2005 | Allen .................. G06F 11/2041 714/6.3 |
| 2007/0213970 A1 * | 9/2007 | Puthupparambil .... G06Q 20/20 703/27 |
| 2008/0098393 A1 * | 4/2008 | Chai ...................... G06Q 20/04 718/101 |
| 2010/0128598 A1 * | 5/2010 | Gandhewar ......... H04L 67/2814 370/217 |
| 2011/0055628 A1 * | 3/2011 | Dennis et al. ................... 714/15 |
| 2011/0055835 A1 * | 3/2011 | Dennis et al. ................ 718/101 |
| 2014/0149286 A1 * | 5/2014 | Forsyth .................. G07F 19/20 705/43 |

\* cited by examiner

*Primary Examiner* — Ariel Yu

(74) *Attorney, Agent, or Firm* — Lee & Hayes, PLLC

(57) ABSTRACT

A payment service is configured to support purchase transactions generated by merchant point-of-sale (POS) devices, wherein each purchase transaction may comprise multiple transaction requests such as authorization requests and capture requests. Each transaction request may be sent to a different one of multiple data centers of the payment service. Upon successfully receiving an acknowledgement from one of the data centers for a transaction request, the POS device designates that data center as the primary data center. Subsequently, all transaction requests for that transaction identify the primary data center, even when the transaction requests are sent to other data centers. At the payment service, the data centers synchronize requests such that the primary data center is informed of all authorizations and is made responsible for performing the capture of the transaction. This allows the primary data center to detect duplicate authorizations and to prevent duplicate captures.

5 Claims, 8 Drawing Sheets

TRANSACTION PAYMENT PROCESSING BY MULTIPLE DATA CENTERS

BACKGROUND

Point-of-sale electronic credit card transactions are authorized and captured by several different entities that communicate with each other over a network connection. In an authorization stage, a credit card or other payment instrument is read by a point-of-sale device. Based on details regarding the payment instrument and a payment amount provided by the merchant, an authorization request for the payment amount is sent electronically from the point-of-sale device to a credit card processor. The credit card processor routes the payment request to a card network, e.g., Visa or Mastercard, which in turn routes the payment request to the card issuer, e.g., a bank. Assuming the card issuer approves the transaction, an approval is then routed back to the merchant.

In a capture stage, a capture request for the approved payment amount is again routed from the merchant to the credit card processor, card network, and card issuer. The capture stage triggers the transfer of funds between the card issuer and the merchant.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
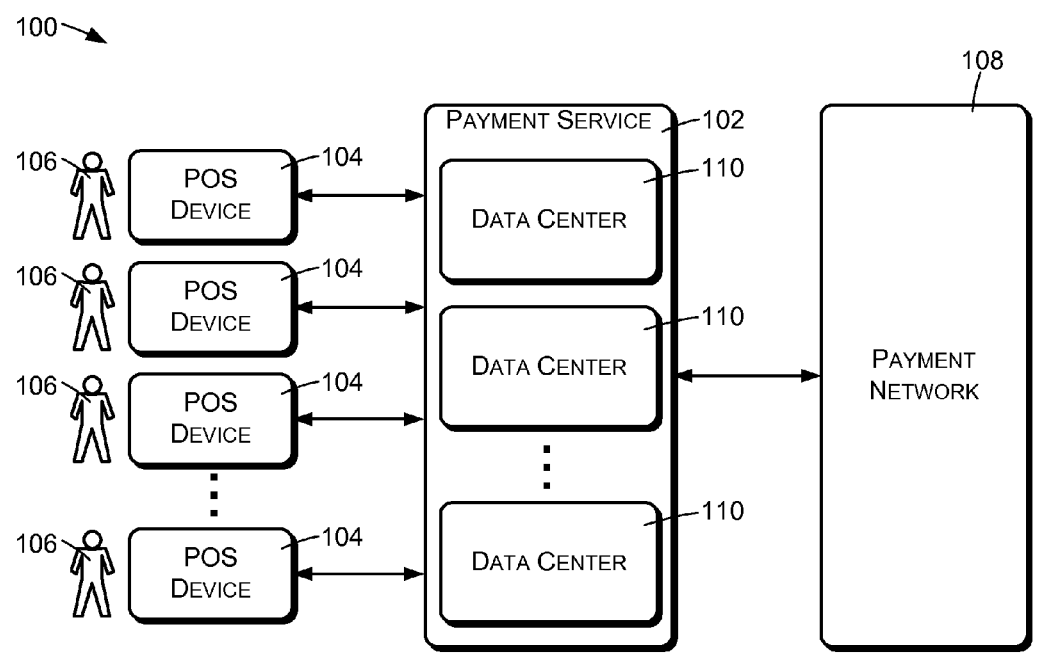
FIG. 1 is a block diagram of an example system that implements techniques for coordinating payment authorizations and transaction captures across multiple data centers of a payment service

A payment processing system may be implemented as a network-based service that receives information from merchant point-of-sale (POS) devices to conduct purchase transactions based on payment instruments provided by customers. Payment instruments may comprise credit cards, debit cards, gift cards, electronic tokens, and so forth. A POS device may perform a transaction involving a payment instrument such as this by sending one or more authorization requests to the payment processing system, followed by a capture request. Each authorization request specifies a payment amount for approval by the issuer of the payment instrument. The capture request triggers the transfer of funds from the customer to the merchant.

In order to provide services for a large number of merchants, the payment processing system may be implemented by servers at geographically dispersed data centers. When requesting services, a POS device may select from any of the data centers, and may send transaction requests to the data centers.

A POS device might typically conduct a particular transaction with a single data center. However, there may be situations in which a particular data center becomes unavailable or does not respond to a request. Rather than waiting for the data center to become available, the POS device can retry the request with a different data center. After a capture request is sent, the data centers synchronize their information to ensure that duplicate authorizations are not captured and to ensure that duplicate captures are not initiated.

In an embodiment described herein, the POS device designates a single data center as being a primary data center for a transaction. The primary data center is responsible for initiating the capture request of the transaction. The first data center from which the POS device receives a request response is designated as the primary data center for a particular transaction.

For example, the POS device may send an authorization request to a first data center and may fail to receive a response, possibly because the data center is down for maintenance. After failing to receive the response, the POS device may send the authorization request to a second data center and may receive a response. Thereafter, every transaction request, including further authorization requests and capture requests, specify the second data center as the primary data center for the transaction. The data centers use this specification to coordinate authorizations and captures.

When a data center receives an authorization request that specifies a different primary data center, the receiving data center performs the authorization and eventually informs the primary data center of the authorization. When a data center receives a capture request that specifies a different primary data center, the receiving data center acknowledges the capture request but does not initiate the capture. Rather, the receiving data center forwards the capture request to the primary data center, and the primary data center initiates the data capture. This allows the primary data center to check for duplicate authorizations and to avoid double captures for the same transaction.

Additional details and scenarios are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 shows an example system 100 that implements techniques for coordinating payment authorizations and transaction captures across multiple data centers of a payment service 102. The payment service 102 provides purchase transaction support to businesses and thereby enables and facilitates payment processing for point-of-sale (POS) transactions between merchants and customers. The term "merchant" as used herein may include any business engaged in the offering of goods or services for acquisition by customers. Actions attributed to a merchant may include actions performed by owners, employees, or other agents of the merchant and thus no distinction is made herein unless specifically discussed. In addition, as used herein, the term "customer" includes any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a purchase transaction in which the customer acquires an item from a merchant, and in return, the customer provides payment to the merchant. As used herein, the term "purchase transaction" includes a financial transaction for the acquisition of items (goods and/or services) that is conducted between a customer and a merchant, including the rental, leasing, borrowing, licensing, etc. of items.

The payment service 102 may include payment processing software, hardware, and/or services that enable a merchant to receive payments from customers when conducting POS purchase transactions with the customers. For example, the payment service 102 may enable a merchant to receive credit card payments, debit card payments, mobile payments, and/or different types of electronic payments from customers.

The payment service 102 interacts with multiple POS computing devices 104, which are associated respectively with different merchants 106. The POS devices 104 are used by the merchants 106 to process payments for purchase transactions from customers. Generally, the POS devices 104 may comprise any of various types of devices, such as terminals, computers, portable devices (tablet computers, smartphones, etc.) and so forth. In some cases, the POS devices 104 may incorporate or work in conjunction with card readers for reading credit cards and/or other payment instruments. In some cases, the POS devices 104 may enable mobile payments, such by allowing a customer to use a smartphone or other mobile device to pay for a purchase transaction. More generally, a POS device is configured to receive information from a payment instrument, which may comprise a physical card or an electronic token or data object, and to interact with bank-related services to facilitate the transfer of funds from the customer to the merchant based on the information from the payment instrument.

A customer pays for a purchase transaction by providing a payment instrument such as a debit card, a credit card, a stored-value or gift card, a check, an electronic token provided by a device carried by the customer, etc. The merchant can interact with the POS device 104 to process the transaction, such as by inputting (e.g., manually, via a magnetic card reader or an RFID reader, etc.) an identifier associated with the payment instrument. For example, a payment instrument of one of the customers may include one or more magnetic strips for providing card and customer information when swiped in a card reader. In other examples, other types of payment cards may be used, such as smart cards having built-in memory chips that are read by the device 104 when the cards are "dipped" into the reader, radio frequency identification tags, and so forth. The merchant and/or the POS device 104 may also provide other information describing the transaction, such as a payment amount, the item(s) being purchased, a time, place and date of the transaction, a card network associated with the payment instrument, an issuing bank of the payment instrument, and so forth.

Although FIG. 1 shows only a single POS device 104 associated with each merchant 106, each merchant 106 may use multiple POS devices 104 that are part of an integrated POS system. Furthermore, the POS devices 104 of a merchant POS system may be used interchangeably during a purchase transaction. That is, a transaction may be initiated on one POS device 104 and completed on another POS device 104. Thus, although the following description assumes that a transaction is completed using a single POS device 104, several different POS devices of the merchant may in fact be used over the course of a single purchase transaction. Furthermore, the actions that are described herein as being performed by a POS device may in certain implementations be performed by a POS system of which the POS device is a part.

The payment service 102 communicates with a payment network 108 to conduct purchase transactions electronically on behalf of the merchants 106. For purposes of discussion, the payment network 108 represents one or more card payment networks (e.g., MasterCard®, VISA®), issuing banks, acquiring banks, and other entities, banks, or institutions that may be involved in processing payment transactions and electronically transferring funds between merchants and customers.

The payment service 102 may comprise a large-scale service that supports many merchants 106, who may be distributed across large geographic areas. In some cases, the payment service 102 may implement POS services through pages of a website that are accessed by the POS devices 104 of the merchants 106. In these cases, the POS devices 104 may comprise devices such as tablet computers or other portable devices that access the pages of the website using an Internet browser. In other cases, tablet computers or other devices may run special-purpose applications that are specifically configured to implement POS services in conjunction with the payment service 102, using network APIs (application program interfaces) that are made available by the payment service 102.

In order to efficiently serve large numbers of geographically dispersed merchants 106, the payment service 102 may be implemented by servers of multiple data centers 110. Each data center 110 is a facility in a different geographic location that houses redundant computing equipment and software to support the operations and services of the payment service 102. An individual POS device 104 may communicate with servers at any one of the data centers 110 to process payment transactions. In the described example, a POS device 104 selects one of the data centers for any given request. Upon receiving a request, the data center routes the request to one of numerous available servers of the data center, each of which is configured similarly to respond to the request.

The POS devices 104 may communicate with the data centers 110 of the payment service 102 through a network infrastructure such as the Internet. More generally, communications may utilize local area networks, wide area networks, wired networks, Wi-Fi and other wireless networks, cellular data networks, close-range wireless communications such as Bluetooth®, near field communications (NFC), etc. Protocols for communicating over such networks are well known and will not be discussed herein in detail. The same or similar communication technologies may also facilitate communication between the payment service 102 and the payment network 108. Various types of encryption and security techniques may be employed to protect communications from eavesdroppers.

Figure 2:
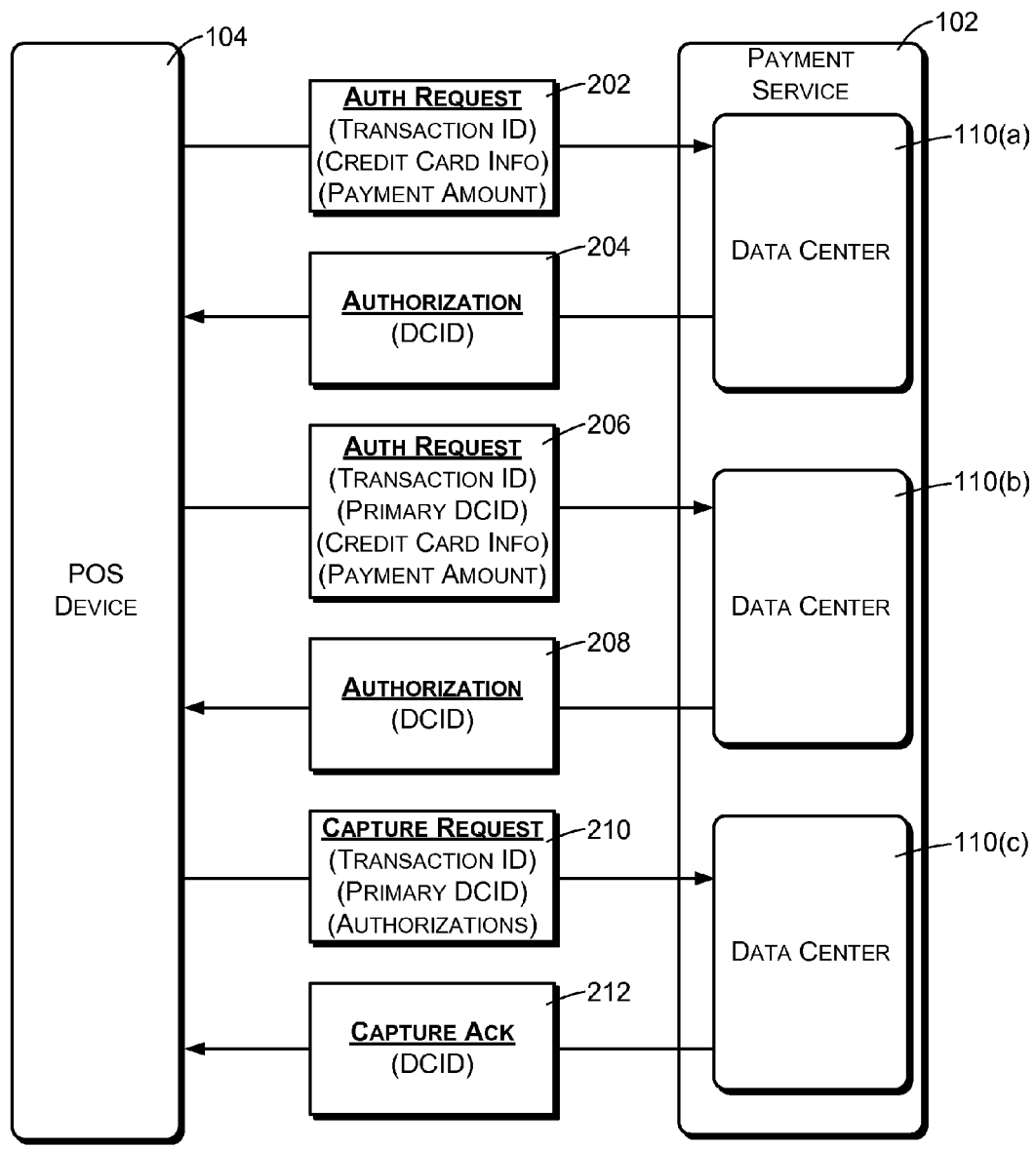
FIG. 2 is a block diagram illustrating example communications within the system of FIG. 1.

FIG. 2 illustrates communications that may take place in an example payment transaction implemented by the payment service 102 and an individual POS device 104. In this example, the payment transaction is conducted in two phases: authorization and capture. This authorization/capture type of payment transaction is frequently used in service settings such as restaurants, where the merchant preliminarily authorizes a payment amount that is subject to subsequent adjustment for tips, additionally ordered menu items, and so forth. In the authorization phase, the merchant obtains an authorization for the payment amount. In the capture phase, the merchant submits a capture request to finalize the transaction and to initiate appropriate funds transfers.

A purchase transaction begins when a merchant specifies a preliminary payment amount for the purchase transaction. The preliminary payment amount may be entered manually by the merchant using the POS device 104 or may be generated automatically by a POS system of the merchant based on prices of purchased or ordered items. Upon being presented with the preliminary payment amount, the customer presents a payment instrument. The payment instrument may comprise a credit card, a debit card, or a similar instrument. In some cases, the payment instrument may comprise an electronic token provided wirelessly by a mobile device, such as when using mobile or cardless payments.

Based on the presented payment amount and payment instrument, the POS device 104 sends an authorization request 202 to the payment service 102. The authorization request 202 specifies various information that may be used by the payment service 102 and in turn by the payment network 108 to obtain authorization for the payment amount. The information may include the payment amount as well as payment instrument details such as credit card information. Credit card information may include things such as the credit card number, a security code, expiration date, and so forth. In addition, the authorization request 202 specifies a transaction identifier (ID) that is unique to the purchase transaction of which the specified payment amount is a part. In addition to uniquely identifying the purchase transaction, the transaction ID may also uniquely identify the POS device 104 and/or the merchant 106 who is submitting the authorization request 202.

The authorization request 202 may be sent to and received by any one of the multiple data centers 110 of the payment service 102. For purposes of discussion, FIG. 2 shows that the authorization request 202 is sent to and received by a first data center 110(a).

In response to receiving the authorization request 202, the receiving first data center 110(a) interacts with the payment network 108 to obtain an authorization of the payment amount. For example, the payment service 102 may provide credit card information and transaction information to a credit card processing network to obtain an approval for the authorization request 202. The payment service 102 may also perform its own risk analysis to determine whether to approve the authorization request 202.

Assuming that the authorization request 202 is approved by both the payment network 108 and the payment service 102, the first data center 110(a) sends an authorization 204 of the payment amount to the POS device 104. The authorization 204 specifies a data center ID, referred to herein as a DCID, corresponding to the receiving first data center 110(a). The DCID uniquely identifies the first data center 110(a) and distinguishes it from the other data centers 110. The authorization 204 may also include other information that is not shown in FIG. 2, such as the approved payment amount, the transaction ID, an authorization number for the payment amount, and so forth.

Upon receiving the authorization 204 and the accompanying DCID of the receiving first data center 110(a), the POS device 104 designates the data first data center 110(a) as the primary data center for the purchase transaction, and associates the DCID of the first data center 110(a) with the transaction ID of the purchase transaction. Subsequently, the POS device 104 will include the DCID of the primary data center, referred to herein as the primary DCID, in each request sent to any one of the data centers 110 regarding the purchase transaction. This allows the data centers 110 to coordinate their handling of the requests among themselves, as will be discussed in detail below.

Some purchase transactions may include multiple authorizations. This may be the case, for example, when a customer presents more than one credit card for payment of a purchase or when multiple customers split the payment for a purchase transaction. As another example, this may occur when a customer orders additional items after an initial authorization. Purchase transactions that include multiple authorizations may be referred to as split tender or multiple tender transactions, and each authorization may be referred to as a tender.

FIG. 2 illustrates a second authorization request 206 that may in some cases be submitted by the POS device 104 as part of a split tender or multiple tender transaction. The second authorization request specifies the transaction ID of the transaction, which is identical to the transaction ID specified by the first authorization request 202. The second authorization request 206 specifies a second payment amount and second credit card information, which may be different than the information specified by the first authorization request 202. In addition, the second authorization request 206 specifies the primary DCID, corresponding to the first data center 110(a), from which the POS device 104 first received a payment amount authorization.

The second authorization request 206 may be sent to and received by any one of the data centers 110. In this example, the second authorization request 206 is shown as being sent to and received by a second data center 110(b), which is different than the first data center 110(a).

Assuming that the second authorization request 206 is approved in a manner similar to the first authorization request 202, the second data center 110(b) sends a second authorization 208 to the POS device 104. The second authorization 208 may indicate the DCID of the responding data center 110(b), which in this example will be different than the primary DCID. The second authorization 208 may also indicate additional information that is not shown in FIG. 2, such as the approved payment amount, the transaction ID, the primary DCID, an authorization number for the payment amount, and so forth.

After all payment amounts for a particular purchase transaction have been approved and the merchant is ready to finalize the transaction, the POS device 104 sends a capture request 210 to the payment service 102. As with any others of the requests, the capture request 210 may be sent to and received by any one of the data centers 110. In this example, the capture request 210 is shown as being sent to and received by a third data center 110(c), which is different than the first data center 110(a) and different than the second data center 110(b).

The capture request 210 specifies the transaction ID of the transaction, which is identical to the transaction ID specified by the first authorization request 202 and by the second authorization request 206. The capture request 210 also specifies previous authorizations and payment amounts that are to be captured. In addition, the second authorization request 206 specifies the primary DCID, corresponding to the first data center 110(a), which was the data center that responded to the first authorization request 202.

In response to receiving the capture request 210, the payment service 102 sends a capture request acknowledgement 212 to the POS device 104. The capture request acknowledgement 212 may specify the DCID of the receiving and responding third data center 110(c), which in this case is not the same as the primary DCID. The capture request acknowledgment 212 may also specify other information as may be appropriate, including the transaction ID, the primary DCID, a listing of captured payment amounts or authorizations, and other information relating to the capture of the purchase transaction.

In the more general case, the requests 202, 206, and 210 shown in FIG. 1 may be sent to and responded to by any combination of data centers. In some cases, the requests may all be sent to the same data center. In other cases, each request may be sent to one of two data centers. The POS device 104 may select the receiving data center based on its location and availability. For example, the POS device 104 may attempt to select, for any transaction or request, the data center that is geographically closest to the merchant. In cases where that data center is unavailable, however, the POS device may select an alternate data center that is farther from the merchant. In some cases, the POS device may submit an authorization request to a first data center, receive an authorization from the first data center, send a capture request to the first data center, and fail to receive a response to the capture request from the first data center. In a situation like this, the POS device may retry the capture request by sending it to a second data center. Subsequent figures will show several example sequences such as this and will explain how the payment service prevents duplicate captures resulting from requests sent to different data centers.

As mentioned above, a merchant may use multiple POS devices and elements of a transaction may be synchronized between the multiple POS devices so that a single transaction may be conducted using two or more POS devices of a merchant. For example, a first POS device may be used for an authorization request and a second POS device may be used for a corresponding capture request. After each request, the response from the payment service 102 may be provided by the payment service 102 to both the requesting POS device and to the other POS devices of the merchant, so that each POS device has information relating to each pending transaction, and so that future requests regarding a transaction may be initiated by any one of the multiple merchant POS devices.

Figure 3:
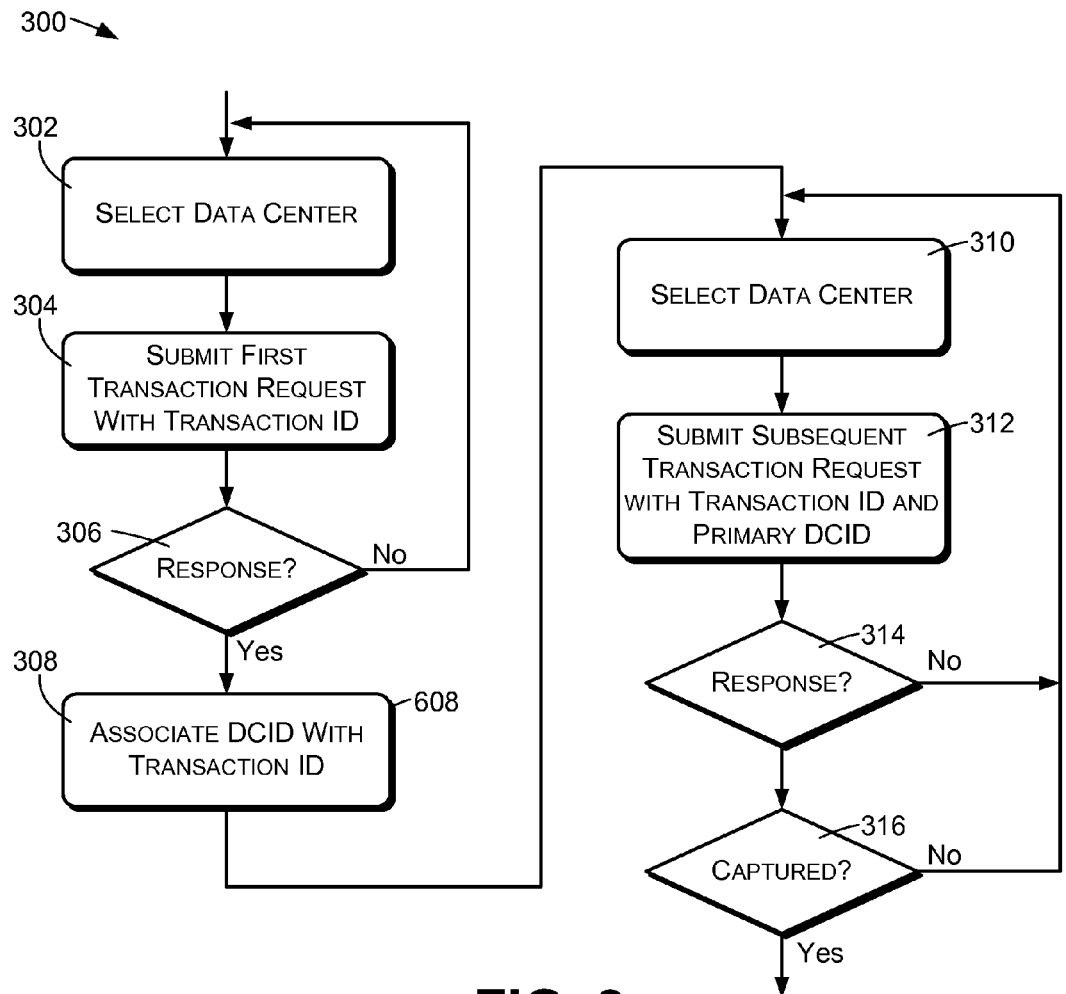
FIG. 3 is a flow diagram illustrating an example method that may be performed by a merchant point-of-sale device to submit transaction requests.

FIG. 3 shows an example method 300 for implementing payment transactions by a merchant POS device. The method 300 may also be performed by multiple devices of a merchant POS system or by other systems that provide POS support for merchants.

The method 300 implements a sequence of transaction requests for a single purchase transaction. In the described environment, a transaction request may comprise an authorization request or a capture request. All transaction requests corresponding to the purchase transaction are identified by a single transaction ID. In multi tender or split tender transactions, details of which will be described with reference to FIG. 8, transaction requests may also comprise bill creation requests, tender requests, and bill completion requests.

An action 302, which is performed by the POS device when the merchant is ready to send an initial transaction request, comprises selecting one of multiple data centers of a payment service to which the transaction request will be submitted. In some embodiments, a merchant POS device may be configured by default to use a particular one of the data centers, such as the data center that is closest geographically to the merchant. In other embodiments, the merchant POS system may select one of the data centers based on its geographic proximity, the speed of communications with the data center, the communication latency with the data center, whether the data center is currently online, and so forth. In some cases, the merchant device may randomly select one of the data centers. In some cases, an initially selected data center may turn out to be unavailable or may fail to respond to a request. This may be because the data center has been disabled for maintenance or because the data center is experiencing problems of some sort. It may also be because of communication problems between the merchant POS device and the data center.

An action 304 comprises sending a first transaction request to the selected data center. In the examples discussed herein, the first transaction request may comprise an authorization request for a payment amount. Alternatively, the first transaction request may comprise a bill creation request.

The first transaction request specifies a transaction ID that uniquely identifies the particular transaction of which the first transaction request is a part. In the case of an authorization request, the authorization request may also include the information discussed above with reference to the authorization request 204.

An action 306 comprises determining whether a response is received from the selected data center. The POS device may fail to receive a response in situations where the selected data center is unavailable due to data center maintenance or operational problems, for example. Other problems may also prevent the POS system from receiving a response from the selected data center, such as communication issues between the POS device and the selected data center.

If a response is not received from the selected data center, the actions 302 and 304 are repeated, where the action 302 selects a different data center and the action 304 comprises resubmitting the first transaction request to the different data center. The different data center may be selected based on its proximity to the merchant and/or other factors, similar to the initial data center selection.

The actions 302, 304, and 306 may be repeated until the merchant POS device receives a response from the selected data center to the submitted first transaction request.

After the merchant POS device receives a response to the action 304 of sending the first transaction request, the merchant POS device performs an action 308 of associating the DCID of the responding data center with the transaction ID of the purchase transaction. This effectively designates the first successfully responding data center as being the primary data center for the purchase transaction, and as being the data center that will have primary responsibility for eventually capturing the authorized payment amounts of the purchase transaction. All subsequent transaction requests sent by the POS device for the purchase transaction will carry the DCID of this first-responding data center, which as mentioned above is referred to herein as the primary DCID of the transaction.

The remaining actions illustrated by FIG. 3 correspond to subsequent transaction requests by the POS device, which may comprise authorization requests or a capture request.

The action 310 comprises selecting a data center. The data center selected in this action may be the same data center selected in the action 302 or may comprise a different data center. The selection may be made based on the factors described above with reference to the action 302.

An action 312 comprises submitting a subsequent transaction request. This transaction request may comprise an authorization request or a capture request. When the subsequent transaction request is an authorization request, the authorization request may specify the information mentioned above with regard to the authorization request 206, including the transaction ID and the primary DCID. When the subsequent transaction request is a capture request, the capture request may specify the information mentioned above with regard to the capture request 210, including the transaction ID and the primary DCID.

An action 314 comprises determining whether a response is received from the selected data center. The POS device may fail to receive a response in situations where the selected data center is unavailable due to data center maintenance or operational problems, for example. Other problems may also prevent the POS system from receiving a response from the selected data center, such as communication issues between the POS device and the selected data center.

If a response is not received from the selected data center, the actions 310 and 312 are repeated, where the action 310 selects a different data center and the action 312 comprises resubmitting the subsequent transaction request to the different data center.

An action 316 comprises determining whether the transaction has been captured, which may be the case when the most recent transaction request was a capture request for which a response was successfully received. If the transaction has not been captured, the actions 310, 312, and 314 are repeated for one or more additional transaction requests. Otherwise, if the transaction has been captured by submitting a capture request and receiving an acknowledgement of the capture request, the method 300 is terminated and the purchase transaction is considered to be completed from the standpoint of the POS device. In some cases, the POS device may provide a receipt at this point.

Figure 4:
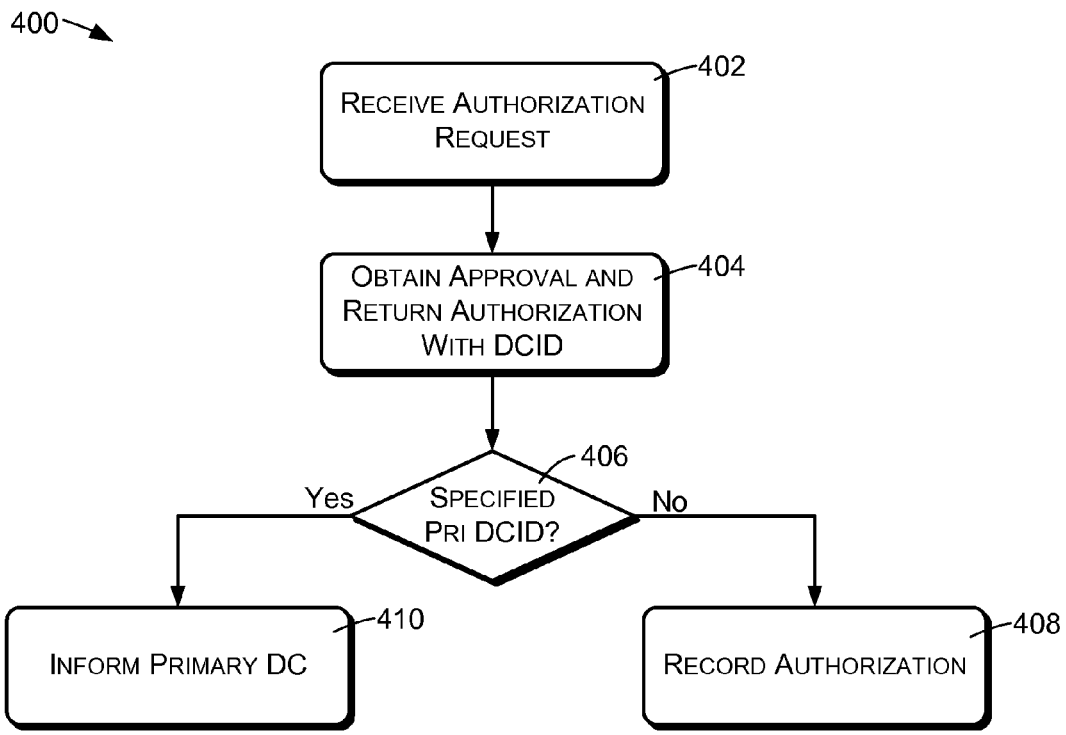
FIG. 4 is a flow diagram illustrating an example method that may be performed by a payment service to process authorization requests.

FIG. 4 shows an example method 400 for performing payment authorizations by a data center of a payment service such as by one of the data centers 110 of the payment service 102. Each data center of multiple data centers is configured to perform the actions of FIG. 4 in response to receiving an authorization request. Accordingly, a merchant POS device may send authorization requests to any one of the multiple data centers, even in cases where the authorization requests are for the same purchase transaction.

An action 402 comprises receiving an authorization request, such as the first authorization request 202 or a subsequent authorization request 206 of FIG. 2. As already discussed, an authorization request may specify a payment amount, a transaction ID and in some cases may specify a primary DCID that indicates a primarily responsible data center, wherein the primarily responsible data center may be a data center other than the data center receiving the authorization request.

An action 404 comprises obtaining approval for the payment amount of the authorization request and returning an authorization to the requesting POS device. The data center receiving the authorization request may obtain an approval by communicating with a card payment network or other payment processing network, such as the payment network 108 of FIG. 1. The returned authorization may include various information as already discussed above with reference to the authorizations 204 and 208. As discussed there, the authorization may specify the DCID of the data center that has received the authorization request and that is providing the authorization to the requesting POS device.

An action 406 comprises determining whether a primary DCID was specified by the received authorization request. As described with reference to FIG. 3, transaction requests other than the first successfully acknowledged transaction request will specify a primary DCID, indicating the data center that is primary responsible for eventual capture of the transaction.

If a primary DCID is not specified by the received authorization request, an action 408 is performed of recording the authorization, to be potentially captured in the future in response to a capture request received from the POS device. If a primary DCID is specified by the authorization request, an action 410 is performed of informing the primary data center, as identified by the specified primary DCID, of the authorization. This allows the primary data center to eventually capture the payment amount of the authorization, in response to a future capture request received from the POS system. The receiving data center may report the payment amount of the authorization, an approval code associated with the authorization, and so forth.

In some cases, the action 410 of informing the primary data center of an authorization may not be immediately possible, because the primary data center may unavailable due to maintenance or communication issues. In these cases, the authorization is queued and provided to the primary data center when the primary data center eventually becomes available.

Figure 5:
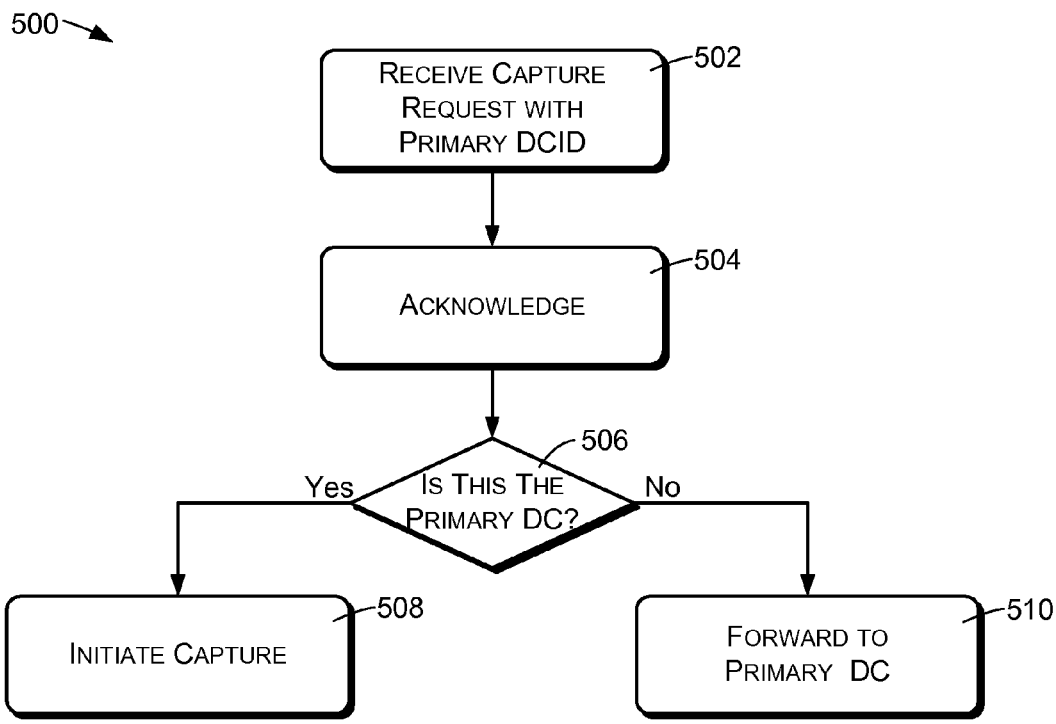
FIG. 5 is a flow diagram illustrating an example method that may be performed by a payment service to process capture requests.

FIG. 5 shows an example method 500 for responding to a capture request, which may be performed by a data center of a payment service such as the payment service 102 of FIG. 1. Each data center of multiple data centers is configured to perform the actions of FIG. 5. Accordingly, a merchant POS device may send a capture request to any one of the multiple data centers of the payment service, even when payment amounts specified by the capture request were approved or authorized by other data centers.

An action 502 comprises receiving a capture request, such as the capture request 210 of FIG. 2. As already discussed, a capture request specifies a transaction ID corresponding to a payment transaction. The capture request may also enumerate previous authorizations and associated payment amounts of the payment transaction. In addition, the capture request specifies a primary DCID that indicates a primarily responsible data center, wherein the primarily responsible data center may be a data center other than the data center receiving the capture request.

An action 504 comprises sending a capture request acknowledgement of the received capture request to the requesting POS device. The acknowledgement indicates to the POS device that the capture request has been received and queued for processing, and that further action by the POS device is not necessary for capturing the payment transaction.

An action 506 comprises determining whether the receiving data center is the primary data center, as indicated by the primary DCID of the capture request. If the receiving data center is the primary data center, an action 508 is performed of initiating a capture of the transaction specified by the capture request. This may involve communicating with a card payment network or other payment processing network, such as the payment network 108 of FIG. 1. In initiating the capture, the primary data center checks for duplicate authorizations and capture requests, and voids or deletes any duplicates. This is possible because any previous requests have either been responded to by the primary data center itself or forwarded to the primary data center by other data centers.

If the receiving data center is not the primary data center, an action 510 is performed of forwarding the capture request to the primary data center. This may comprise forwarding the information specified by the received capture request, such as the transaction ID, the primary DCID, enumerated authorizations and payment amounts, etc.

In some cases, the action 510 of forwarding the capture request to the primary data center may not be immediately possible, because the primary data center may be unavailable due to maintenance or communication issues. In these cases, the capture request is queued and provided to the primary data center when the primary data center eventually becomes available.

Upon receiving a forwarded capture request, the primary data center for the transaction initiates the requested capture by communicating with the payment network 108 of FIG. 1. In initiating the capture, the primary data center checks for duplicate authorizations and capture requests, and voids or deletes any duplicates. This is possible because any previous requests have either been responded to by the primary data center itself or forwarded to the primary data center by other data centers.

Figure 6:
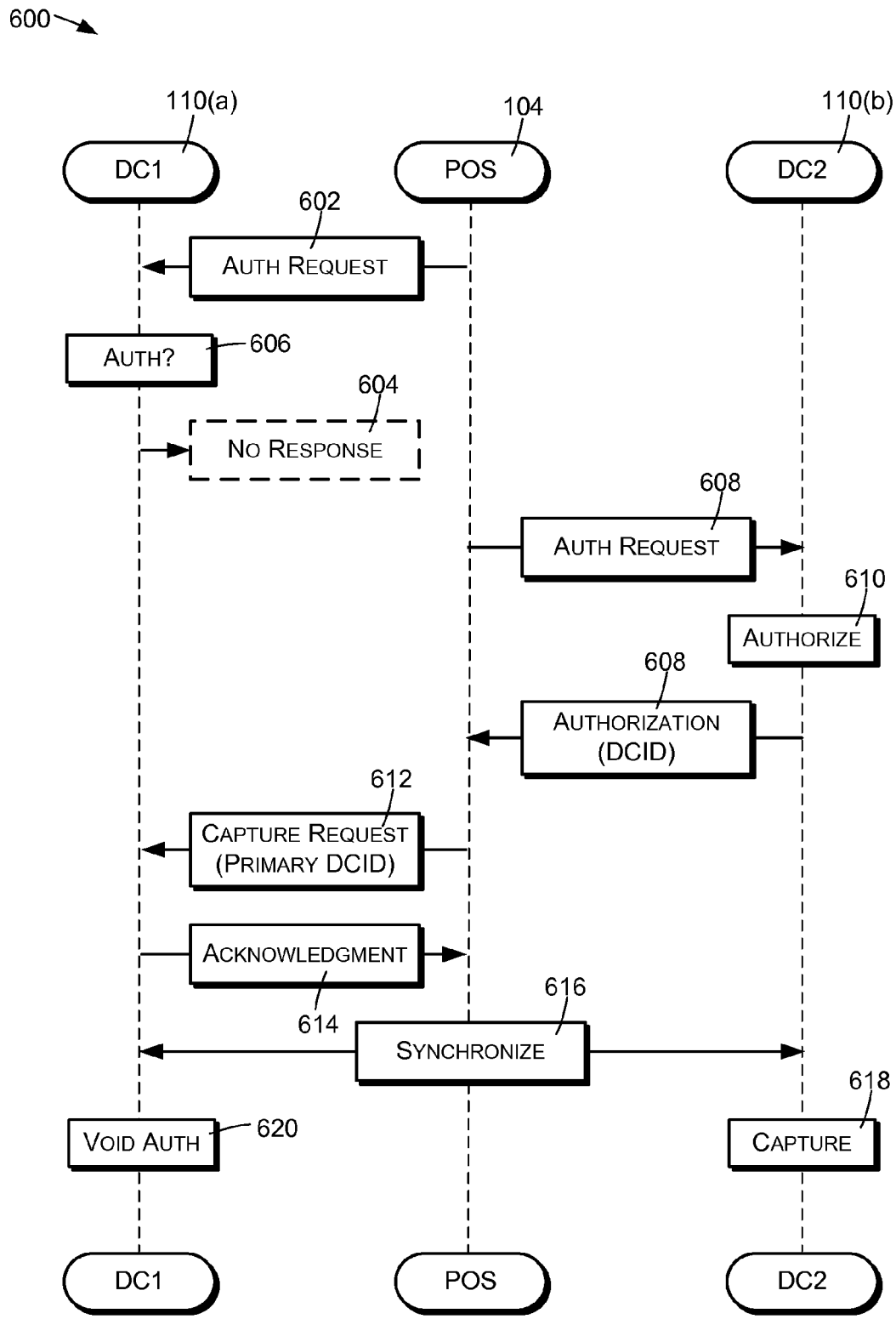
FIGS. 6-8 are diagrams illustrating different sequences of communications between a merchant point-of-sale device and different data centers of a payment service to process transaction requests.
Figure 7:
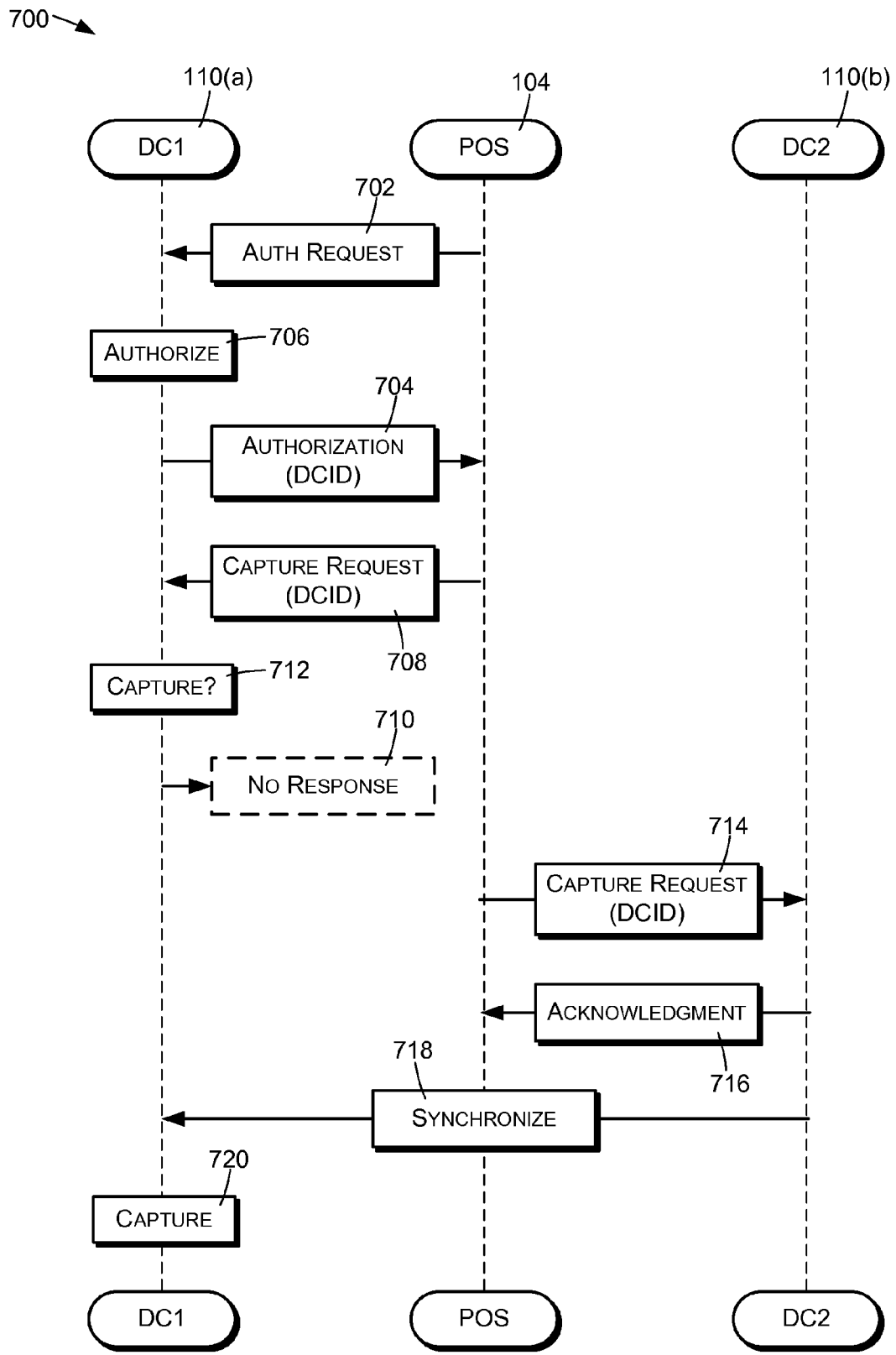
Figure 8:
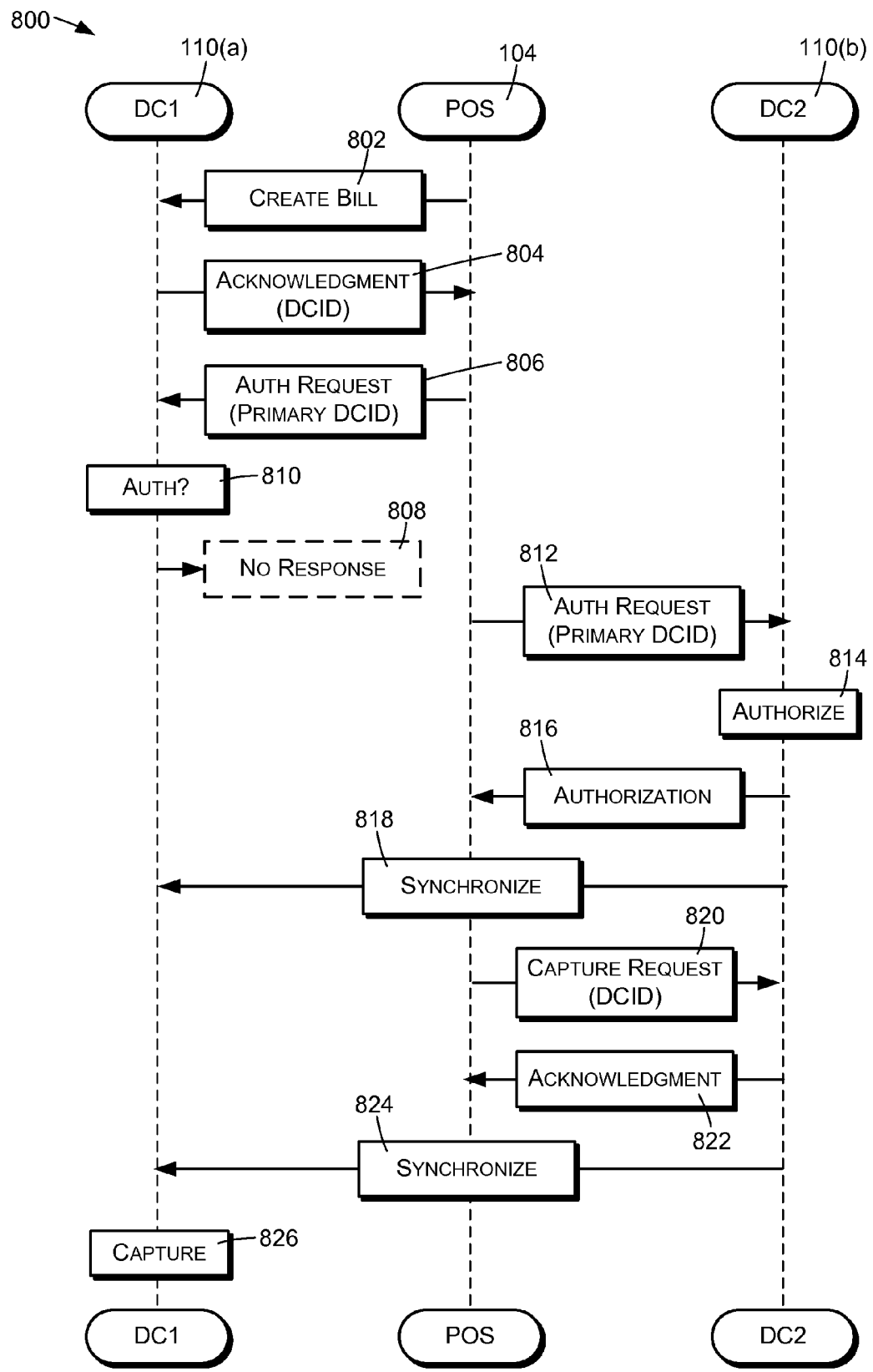

FIGS. 6-8 illustrate example scenarios that may occur in which different transaction requests relating to a common transaction may be serviced by different data centers 110 of the payment service 102. The diagrams show communications, ordered from top to bottom, between a merchant POS system 104, a first data center 110(*a*) shown as DC1, and a second data center 110(*b*) shown as DC2. Although these examples illustrate using two data centers, the techniques may be generalized for use with any number of data centers.

FIG. 6 illustrates a scenario 600 in which the POS device 104 initially attempts to authorize a payment amount with the first data center 110(*a*), fails to receive a response from the first data center 110(*a*), and subsequently authorizes the payment amount with the second data center 110(*b*).

The POS device 104 initially sends a first authorization request 602 to the first data center 110(*a*). As indicated by the dashed block 604, the POS device 104 fails to receive a response from the first data center 110(*a*), which could be because the first data center 110(*a*) is inoperative, that there is a communication issue between the POS device 104 and the first data center 110(*a*), or that a communication error occurred during communications between the POS device 104 and the first data center 110(*a*). Meanwhile, the status of the first authorization request 602 is unknown to the POS device 104, because the first data center 110(*a*) may or may not have obtained an authorization 606 in response to the first authorization request 602, despite the POS device 104 not having received a response to the authorization request 602.

In response to failing to receive a response to the first authorization request 602, the POS device 104 sends a second authorization request 608 for the payment amount to the second data center 110(*b*). The second authorization request 608 may be essentially identical to the prior authorization request 602, and may specify the same information. In this case, the POS device 104 does receive an authorization response 608 from the second data center 110(*b*), indicating that the data center did obtain an authorization 610 for the requested payment amount. The authorization response 608 specifies the DCID of the second data center 110(*b*). Henceforth, the DCID of the second data center 110(*b*) is considered to be the primary DCID, and is specified by the POS device 104 in all future transaction requests, including authorization and capture requests.

The POS device 104 then sends a capture request 612 to the first data center 110(*a*). The capture request specifies the primary DCID, corresponding to the DCID of the second data center 110(*b*) from which the authorization response 608 was received. The first data center 110(*a*) responds with an acknowledgement response 614.

After and/or at any time before receiving the capture request 612, the first and second data centers 110(*a*) and 110(*b*) synchronize their information regarding the transaction. In this example, the synchronization comprises forwarding the capture request 612 from the first data center 110(*a*) to the second data center 110(*b*), where the second data center 110(*b*) corresponds to the primary DCID specified by the capture request 612. For example, upon receiving the capture request 612, the first data center 110(*a*) may immediately, or as soon as the second data center 110(*b*) is able to receive communications, send the information specified by the capture request 612 to the second data center 110(*b*), which in this example is considered the primary data center. Upon receiving the forwarded capture request, which indicates the DCID of the second data center 110(*b*), the second data center initiates a capture of the transaction, where the capture includes the payment amount specified by the authorization request 608.

The synchronization 616 may additionally include exchanging information regarding previous authorizations obtained for the transaction so that duplicated authorizations may be detected and voided. In this example, the first data center 110(*a*) is shown as performing an action 620 of voiding the authorization 606 (assuming it was actually obtained), since it is a duplicate of the second authorization 610.

FIG. 7 illustrates a scenario 700 in which the POS 104 initially authorizes a payment amount with the first data center 110(*a*) and eventually captures the transaction using the second data center 110(*b*). The POS device 104 initially sends an authorization request 702 to the first data center 110(*a*). The initial authorization request 702 does not specify a primary DCID. The POS device receives an authorization response 704 from the first data center 110(*a*), indicating that the first data center 110(*a*) obtained a bank authorization 706 for the requested payment amount. The authorization response 704 specifies the DCID of the first data center 110(*a*), which being the first responsive data center is considered to be the primary data center for the transaction. Henceforth, the DCID of the first data center 110(*a*) is considered to be the primary DCID.

The POS device 104 then sends a first capture request 708 to the first data center 110(*a*). The first capture request (and all subsequent requests) specifies the primary DCID, corresponding to the DCID of the first data center from which the authorization communication 704 was received.

As indicated by the dashed block 710, the POS device 104 fails to receive a response from the first data center 110(*a*), which could be because the first data center 110(*a*) is inoperative, because there is a communication issue between the POS device 104 and the first data center 110(*a*), or because an error occurred during communications between the POS device 104 and the first data center 110(*a*). Meanwhile, the status of the first capture request 708 is unknown to the POS device 104, because the first data center 110(*a*) may or may not have initiated an actual capture 712 of the transaction in response to the first capture request 708.

In response to failing to receive a response to the first capture request 708, the POS device 104 sends a second capture request 714 for the payment amount to the second data center 110(b). The second capture request 714 may be essentially identical to the prior capture request 708, and may specify the same information. In this case, the second data center 110(b) sends and the POS device 104 receives a capture acknowledgment response 716. However, the second data center 110(b) does not initiate the actual capture of the transaction. Rather, in a synchronization operation 718, the second data center 110(b) forwards the capture request 714 to the first data center 110(a), based on the primary DCID specified by the capture request 714, which corresponds to the first data center 110(a). In response to receiving the forwarded capture request, the first data center 110(a) may in some cases initiate an actual capture 720 of the transaction. In particular, the second capture 720 is performed if the first capture 712 was not already performed. If the first capture 712 was successfully performed, the second capture 720 is not performed.

FIG. 8 illustrates a multiple tender scenario 800 in which a transaction consists of multiple payment amounts and corresponding authorizations. In a multiple tender transaction, the first transaction request by the POS device 104 comprises a bill creation request 802. The bill creation request 802 is similar to an authorization request and may contain largely the same information, except that the bill creation request 802 does not specify a payment amount or request authorization for a payment amount. Rather, the bill creation request 802 specifies credit card information and a transaction ID, and payment amounts are authorized in subsequent authorization requests.

In the example of FIG. 8, the bill creation request 802 is sent to the first data center 110(a), which in response provides an acknowledgement response 804 containing the DCID of the first data center 110(a). Henceforth, the first data center 110(a) is considered by the POS device 104 to be the primary data center, and the DCID of the first data center 110(a) is considered to be the primary DCID.

The POS device 104 then sends a first authorization request 806 to the first data center 110(a). The first authorization request 806 specifies the primary DCID, corresponding to the DCID of the first data center 110(a) from which the acknowledgement 804 was received. As indicated by the dashed block 808, the POS device 104 fails to receive a response from the first data center 110(a) in response to the first authorization request 806, which could be because the first data center 110(a) is inoperative, because there is a communication issue between the POS device 104 and the first data center 110(a), or because an error occurred during communications between the POS device 104 and the first data center 110(a). Meanwhile, the status of the first authorization request 806 is unknown to the POS device 104, because the first data center 110(a) may or may not have obtained a first authorization 810 in response to the first authorization request 806.

In response to failing to receive a response to the first authorization request 806, the POS device 104 sends a second authorization request 812 for the payment amount to the second data center 110(b). The second authorization request 812 may be essentially identical to the prior authorization request 806, and may specify the same information. The second authorization request 812 specifies the primary DCID, corresponding to the DCID of the first data center 110(a) in this example.

In this case, the POS device does receive an authorization response 816 from the second data center 110(b), indicating that the second data center 110(b) did obtain an authorization 814 for the requested payment amount.

In this multiple tender example, the POS device 104 may obtain multiple authorizations, for multiple payment amounts, by sending multiple authorization requests to any one of the data centers, where each authorization request specifies the primary DCID, which is the DCID of the first responding data center. In the case where an authorization is provided from a data center other than the primary data center, the authorization is synchronized in an action 818, which may comprise notifying or informing the primary data center of the authorization. In other words, the details of any authorizations performed by a non-primary data center are eventually communicated to the primary data center of the transaction, so that the primary data center can detect duplicate authorizations.

After obtaining all authorizations, the POS device 104 sends a capture request 820 to any one of the data centers 110. In this example, the capture request 820 is sent to the second data center 110(b). The capture request 820 specifies the primary DCID, corresponding to the DCID of the first data center 110(a), from which the acknowledgement 804 was received. The second data center 110(b) responds to the POS device 104 with an acknowledgement response 822.

After receiving the capture request 820, the first and second data centers 110(a) and 110(b) synchronize their information regarding the transaction. In certain embodiments, this may comprise forwarding the capture request 820 from the second data center 110(b) to the first data center 110(a), where the first data center 110(a) corresponds to the primary DCID specified by the capture request 820. For example, upon receiving the capture request 820, the second data center 110(b) may immediately, or as soon as the first data center 110(a) is able to receive communications, send the information specified by the capture request 820 to the first data center 110(a), which in this example is considered the primary data center. Upon receiving the forwarded capture request, which indicates the DCID of the first data center 110(a), the first data center 110(a) initiates a capture 826 of the transaction, which includes the payment amount of previous authorization requests corresponding to the transaction.

Each of the above scenarios is merely an example and many variations are possible. Moreover, many variations of the techniques discussed above are possible as well without departing from the scope of this disclosure.

Figure 9:
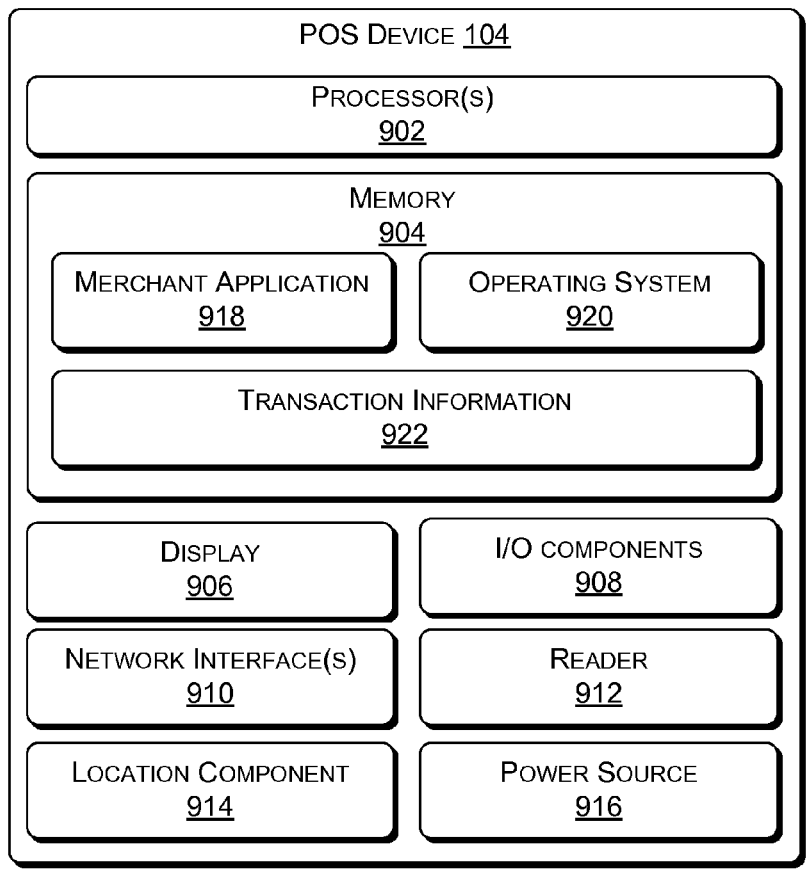
FIG. 9 is a block diagram of an example merchant point-of-sale device.

FIG. 9 illustrates select example components of an example POS device 104 according to some implementations. The POS device 104 may be any suitable type of computing device, e.g., mobile, semi-mobile, semi-stationary, or stationary. Some examples of the POS device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 104 includes at least one processor 902, memory 904, a display 906, one or more input/output (I/O) components 908, one or more network interfaces 910, at least one card reader 912, at least one location component 914, and at least one power source 916. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the memory 904.

Depending on the configuration of the POS device 104, the memory 904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 904 may include, but is not limited to, RAM, ROM, EEPROM, flash memory, solid-state storage, magnetic disk storage, optical storage, and/or other computer-readable media technology. Further, in some cases, the POS device 104 may access external storage, such as RAID storage systems, storage arrays, network attached storage, storage area networks, cloud storage, or any other medium that can be used to store information and that can be accessed by the processor 902 directly or through another computing device or network. Accordingly, the memory 904 may be computer storage media able to store instructions, modules or components that may be executed by the processor 902. Further, when mentioned, non-transitory computer-readable media exclude media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the POS device 104. Functional components of the POS device 104 stored in the memory 904 may include a merchant application 918, which may present an interface on the POS device 104 to enable the merchant to conduct transactions, receive payments, and so forth, as well as communicating with the payment service 102 for processing payments and sending transaction information. Further, the merchant application 918 may present an interface to enable the merchant to manage the merchant's account, and the like.

Additional functional components may include an operating system 920 for controlling and managing various functions of the POS device 104 and for enabling basic user interactions with the POS device 104. The memory 904 may also store transaction information/data 922 that is received based on the merchant associated with the POS device 104 engaging in various transactions with customers.

In addition, the memory 904 may also store data, data structures and the like, that are used by the functional components. For example, this data may include item information that includes information about the items offered by the merchant, which may include images of the items, descriptions of the items, prices of the items, and so forth. Depending on the type of the POS device 104, the memory 904 may also optionally include other functional components and data, which may include programs, drivers, etc., and the data used or generated by the functional components. Further, the POS device 104 may include many other logical, programmatic and physical components, of which those described are merely examples that are related to the discussion herein.

The network interface(s) 910 may include one or more interfaces and hardware components for enabling communication with various other devices over a network or directly. For example, network interface(s) 910 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O components 908 may include speakers, a microphone, a camera, various user controls (e.g., buttons, a joystick, a keyboard, a keypad, etc.), and/or a haptic output device, and so forth.

In addition, the POS device 104 may include or may be connectable to a payment instrument reader 912. In some examples, the reader 912 may plug in to a port in the POS device 104, such as a microphone/headphone port, a data port, or other suitable port. In other instances, the reader 912 is integral with the POS device 104. The reader 912 may include a read head for reading a magnetic strip of a payment card, and further may include encryption technology for encrypting the information read from the magnetic strip. Alternatively, numerous other types of card readers may be employed with the POS devices 104 herein, depending on the type and configuration of a particular POS device 104.

The location component 914 may include a GPS device able to indicate location information, or the location component 914 may comprise any other location-based sensor. The POS device 104 may also include one or more additional sensors (not shown), such as an accelerometer, gyroscope, compass, proximity sensor, and the like. Additionally, the POS device 104 may include various other components that are not shown, examples of which include removable storage, a power control unit, and so forth.

Figure 10:
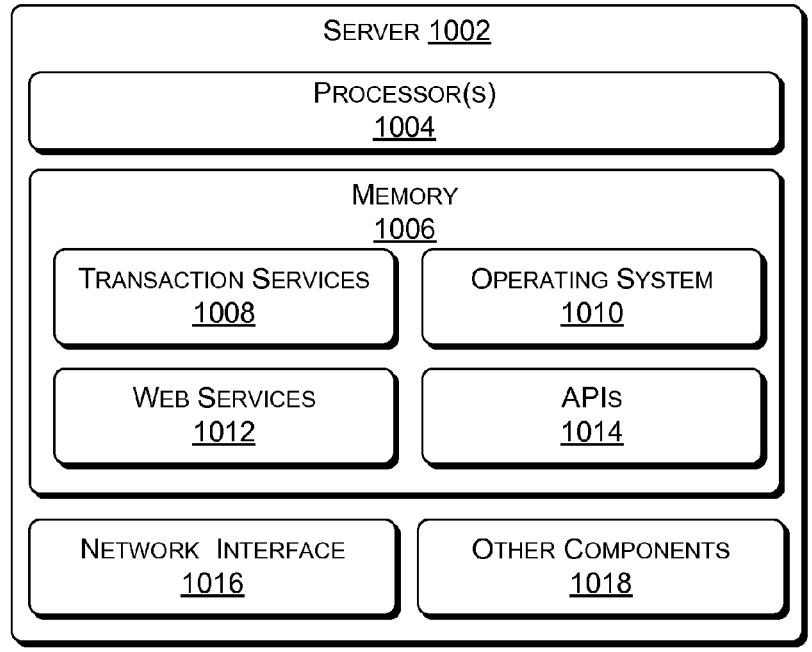
FIG. 10 is a block diagram of an example server that may be used to implement the payment service and data centers described herein.

FIG. 10 shows an example of a server 1002, which may be used within any one of the data centers 110 to provide the functionality of the payment service 102 as described herein. Generally, the payment service 102 is implemented by a plurality of servers 1002, groups of which are located in different data centers 110. The multiple servers 1002 provide redundant functionality across data centers and within individual data centers.

In the illustrated example, the server 1002 includes at least one processor 1004 and associated memory 1006. Each processor 1004 may itself comprise one or more processors or processing cores. For example, the processor 1004 can be implemented as one or more microprocessors, microcomputers, microcontrollers, digital signal processors, central processing units, state machines, logic circuitries, and/or any devices that manipulate signals based on operational instructions. In some cases, the processor 1004 may be one or more hardware processors and/or logic circuits of any suitable type specifically programmed or configured to execute the algorithms and processes described herein. The processor 1004 can be configured to fetch and execute computer-readable processor-executable instructions stored in the memory 1006.

Depending on the configuration of the server 1002, the memory 1006 may be an example of tangible non-transitory computer storage media and may include volatile and non-volatile memory and/or removable and non-removable media implemented in any type of technology for storage of information such as computer-readable processor-executable instructions, data structures, program modules or other data. The memory 1006 may include, but is not limited to, RAM, ROM, EEPROM, flash memory, solid-state storage, magnetic disk storage, optical storage, and/or other computer-readable media technology. Further, in some cases, the server 1002 may access external storage, such as RAID storage systems, storage arrays, network attached storage, storage area networks, cloud storage, or any other medium that can be used to store information and that can be accessed by the processor 1004 directly or through another computing device or network. Accordingly, the memory 1006 may be computer storage media able to store instructions, modules or components that may be executed by the processor 1004. Further, when mentioned, non-transitory computer-readable media exclude media such as energy, carrier signals, electromagnetic waves, and signals per se.

The memory 1006 may be used to store and maintain any number of functional components that are executable by the processor 1004. In some implementations, these functional components comprise instructions or programs that are executable by the processor 1004 and that, when executed, implement operational logic for performing the actions and services attributed above to the payment service 102. Functional components stored in the memory 1006 may include a transaction services component 1008 that receives, processes and responds to transaction requests in accordance with the preceding discussion. The transaction services 1008 may also be responsible for synchronizing transactions between data centers as described above.

Additional functional components may include an operating system 1010 and a web services component 1012. The memory 1006 may also store APIs (application programming interfaces) 1014 that are used for communications between the server 1002 and the POS devices 104. The memory 1006 may also store data, data structures and the like, that are used by the functional components.

The server 1002 may have a network communications interface 1016, such as an Ethernet communications interface, which provides communication by the server 1002 with other servers, with the Internet, and ultimately with the POS devices 104.

The server 1002 may of course include many other logical, programmatic, and physical components 1018 that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more non-transitory computer-readable media storing instructions executable by the one or more processors, wherein the instructions program the one or more processors to perform acts comprising:
receiving, by a point-of-sale computing system, an identifier associated with a payment card that is to be used to process a payment for a purchase transaction, the identifier being obtained via a card reader;
sending over a network, by the point-of-sale computing system to a first data center of a payment service, a first authorization request for a first payment amount corresponding to the purchase transaction;
receiving, by the first data center, the first authorization request for the first payment amount;
sending over the network, by the first data center to the point-of-sale computing system, a first authorization for the first payment amount, wherein the first authorization specifies a first data center identifier corresponding to the first data center;
determining, by the point-of-sale computing system, that the first data center is unavailable after sending the first authorization;
sending over the network, by the point-of-sale computing system to a second data center of the payment service, a capture request for the first payment amount, wherein the capture request specifies the first data center identifier corresponding to the first data center;
receiving, by the second data center, the capture request;
sending, by the second data center to the point-of-sale computing system over the network, an acknowledgement of the capture request, wherein the acknowledgement of the capture request indicates receipt of the capture request by the second data center;
forwarding, over the network, the capture request from the second data center to the first data center based at least in part on the specification of the first data center identifier by the capture request; and
initiating, by the first data center, a capture of the first payment amount via a payment network.

2. The system of claim 1, the acts further comprising:
sending over the network, by the point-of-sale computing system to one of the data centers other than the first data center prior to sending the first authorization request, a prior authorization request for the first payment;
wherein the point-of-sale computing system fails to receive a response to the prior authorization request, and wherein sending the first authorization request is performed after failing to receive the response to the prior authorization request.

3. The system of claim 1, the acts further comprising:
sending over the network, by the point-of-sale computing system to one of the data centers other than the first data center, a second authorization request for a second payment amount corresponding to the transaction, wherein the second authorization request specifies the first data center identifier corresponding to the first data center;
receiving, by said one of the data centers, the second authorization request for the second payment amount;
sending over the network, by said one of the data centers to the point-of-sale computing system, a second authorization for the second payment amount;
notifying the first data center of the second authorization; and
wherein the capture request is also for the second payment amount.

4. The system of claim 1, wherein:
the first authorization request specifies a transaction identifier; and
the capture request specifies the transaction identifier.

5. The system of claim 1, wherein the first data center communicates with a payment processing network to authorize the first payment amount and to initiate the capture of the first payment amount.

* * * * *